(No Model.)
W. T. DOREMUS.
PILLOW OR BOLSTER.
No. 243,869. Patented July 5, 1881.
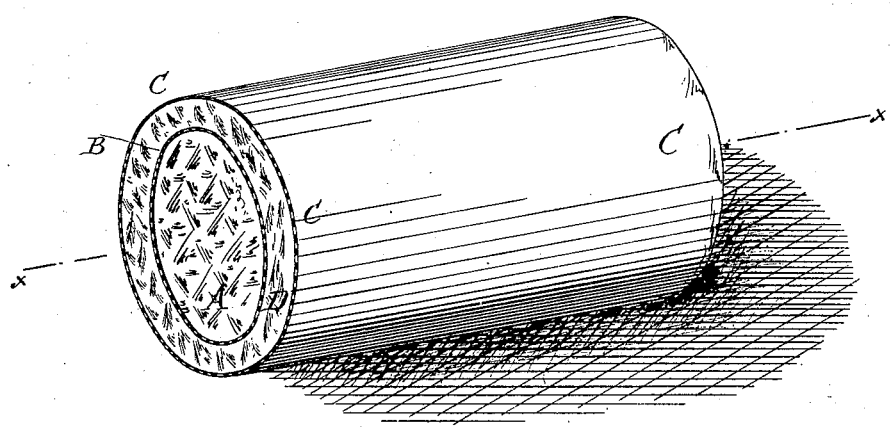
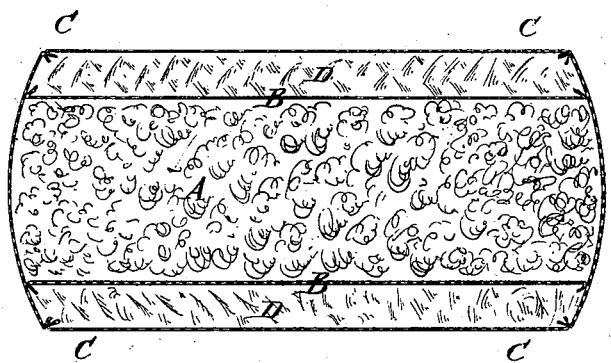
WITNESSES:
Chas. Niela
C. Sedgwick
INVENTOR:
W. T. Doremus
BY Munn & Co
ATTORNEYS.
N. PETERS. Photo-Lithographer, Washington, D. C.

UNITED STATES PATENT OFFICE.

WILLIAM T. DOREMUS, OF NEW YORK, N. Y.

PILLOW OR BOLSTER.

SPECIFICATION forming part of Letters Patent No. 243,869, dated July 5, 1881.

Application filed June 7, 1881. (No model.)

*To all whom it may concern:*

Be it known that I, WILLIAM T. DOREMUS, of the city, county, and State of New York, have invented a new and useful Improvement in Pillows and Bolsters, of which the following is a specification.

Figure 1 is perspective view of my improvement, showing one end in cross-section; and Fig. 2 is a sectional side elevation of the same, taken through the line $x\ x$, Fig. 1.

Similar letters of reference indicate corresponding parts.

The object of this invention is to prevent the stuffing of pillows and bolsters from being crowded out of place by pressure applied to parts of the said pillows or bolsters.

The invention consists of a pillow or bolster made with an inner cover filled with stuffing, and an outer cover having a layer of stuffing interposed between it and the said inner cover, whereby the stuffing will be kept in place when under pressure.

In the drawings of my improvement, A D represent the stuffing, B the inner cover, and C the outer cover. The stuffing A D can be feathers, hair, moss, cotton, or other suitable material.

In making my improvements a small tick or cover, B, is filled with stuffing A, and the center or core thus formed is placed within a larger tick or cover, C. The space between the covers B C is then filled with stuffing, which may be the same material as the stuffing A of the inner cover, B, or a different material, as may be desired. The ends of the pillow or bolster are then closed by a piece of cloth sewed to the edges of the two covers B C, as shown in the drawings, or small pieces of cloth can be sewed to the edges of the inner cover, B, and larger pieces can be sewed to the edges of the outer cover, C, or to the edges of both covers B C.

With this construction the two covers B C will confine the stuffing so that it will not be liable to be crowded out of place by a pressure applied to a part of the pillow or bolster, so that the part of the said pillow or bolster under pressure will retain its thickness and elasticity instead of becoming thin and inelastic by the movement of the stuffing toward the ends of the said pillow or bolster, as is the case with pillows and bolsters made in the ordinary manner.

The improvement can be made long to serve as a bolster or short to serve as a pillow or cushion.

Having thus described my invention, I claim as new and desire to secure by Letters Patent—

1. As an improved article of manufacture, a pillow or bolster made of an inner cover, B, provided with stuffing A, and a larger outer cover, C, having stuffing D interposed between it and the said inner cover, B, as set forth.

2. In a pillow or bolster, the combination of a central part or core, A B, and an outer or ring part, D C, substantially as herein shown and described, whereby the stuffing will be kept in place, as set forth.

WILLIAM T. DOREMUS.

Witnesses:
 JAMES T. GRAHAM,
 C. SEDGWICK.